United States Patent Office 3,172,891
Patented Mar. 9, 1965

3,172,891
SYNTHESIS OF TRIETHYLENEDIAMINE
Walter H. Brader, Jr., and Richard L. Rowton, Austin, Tex., assignors to Jefferson Chemical Company, Inc., Houston, Tex., a corporation of Delaware
No Drawing. Filed Oct. 21, 1963, Ser. No. 317,762
3 Claims. (Cl. 260—268)

This invention relates to the preparation of triethylenediamine. More particularly, this invention relates to a method for the production of triethylenediamine from 2-(2-hydroxyethoxy)ethylamine.

It has heretofore been proposed to prepare diazabicyclo-(2.2.2)-octane (commercially referred to as triethylenediamine) by the reaction of a polyamine such as ethylenediamine, diethylenetriamine, N-aminoethylpiperazine, etc., with ammonia in the presence of a silica-alumina or tungsten oxide catalyst.

The discovery of a synthesis for triethylenediamine from 2-(2-hydroxyethoxy)ethylamine (sometimes referred to as diglycolamine) is truly surprising when one considers that the feed material is an ether, whereas the product is a bicyclic diamine. This is illustrated by the following generalized equation:

$H_2N-CH_2CH_2-O-CH_2CH_2-OH + NH_3 \longrightarrow$ 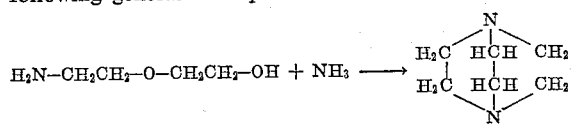

Manifestly, molecular disassociation and recombination is necessary to achieve the desired result.

The discovery of the present invention is that triethylenediamine can be prepared from 2-(2-hydroxyethoxyethoxy)-ethylamine by bringing 2-(2-hydroxyethoxy)ethylamine and ammonia into contact with an aluminum phosphate catalyst under reaction conditions including a temperature within the range of about 250° to about 550° C., and more preferably, a temperature within the range of about 270° to 550° C.

The reaction is preferably conducted under vapor phase conditions and at atmospheric pressure. However, subatmospheric or superatmospheric pressures may be used if desired.

In general, from about 1 to about 15 mols of ammonia should be employed per mol of 2-(2-hydroxyethoxy)ethylamine, and still more preferably, from about 3 to about 10 mols of ammonia will be employed.

Space velocities may suitably be about 0.5 to about 3.0 g./cc. catalyst/hour.

The invention will be further illustrated by the following specific example, which is given by way of illustration and not as a limitation on the scope of this invention.

Example

Diglycolamine was reacted over 50 cc. of 4–8 mesh aluminum phosphate. The reaction conditions were: 375° C., 1 atmosphere pressure, a diglycolamine flow rate of 1.15 g./cc. catalyst/hour and an ammonia flow rate of 0.59 g./cc. catalyst/hour. The product analysis gave the following results:

Diglycolamine conversion, percent _____ 100
Mol percent yield of morpholine _____ 15
Mol percent yield of piperazine _____ 5
Mol percent yield of triethylenediamine _____ 10

From these results, it is seen that one of the significant products of the reaction was triethylenediamine and that, also, piperazine was formed at a moderate yield.

This application is a continuation-in-part of copending application Serial No. 182,122, filed March 23, 1962, and now abandoned.

Having thus described our invention, what is claimed is:

1. A method for the production of triethylenediamine which comprises the steps of contacting 2-(2-hydroxyethoxy)ethylamine and ammonia with aluminum phosphate at a temperature within the range of from about 250° to about 550° C.

2. A method which comprises the steps of contacting a 2-(2-hydroxyethoxy)ethylamine feed and from about 1 to about 15 mols of ammonia per mol of feed with aluminum phosphate at a temperature within the range of about 250° to about 550° C. to thereby provide a reaction product comprising triethylenediamine.

3. A method as in claim 2 wherein the temperature is within the range of about 300° to about 500° C., wherein from about 3 to about 10 mols of ammonia per mol of 2-(2-hydroxyethoxy)ethylamine are employed and wherein the reaction is conducted at about atmospheric pressure.

No references cited.